(12) United States Patent
Azuma et al.

(10) Patent No.: US 7,701,528 B2
(45) Date of Patent: Apr. 20, 2010

(54) LIQUID CRYSTAL DISPLAY DEVICE

(75) Inventors: Yuji Azuma, Fujisawa (JP); Masaki Tsubokura, Mobara (JP); Shimon Itakura, Mobara (JP)

(73) Assignee: Hitachi Displays, Ltd., Mobara-shi (JP)

( * ) Notice: Subject to any disclaimer, the term of this patent is extended or adjusted under 35 U.S.C. 154(b) by 138 days.

(21) Appl. No.: 11/956,373

(22) Filed: Dec. 14, 2007

(65) Prior Publication Data

US 2008/0143919 A1    Jun. 19, 2008

(30) Foreign Application Priority Data

Dec. 15, 2006   (JP) .............................. 2006-337867

(51) Int. Cl.
G02F 1/1333   (2006.01)
(52) U.S. Cl. .............................. 349/58; 349/65; 349/70; 362/632; 362/614
(58) Field of Classification Search .................... 349/58, 349/70, 67, 65; 362/614, 615, 632, 633, 362/634
See application file for complete search history.

(56) References Cited

U.S. PATENT DOCUMENTS 7,287,893 B2    10/2007   Kruijt et al.
7,530,703 B2 *   5/2009   Ryu .............................. 362/29
2002/0113924 A1 *   8/2002   Saito et al. .................. 349/112
2006/0158579 A1    7/2006   Hasegawa

FOREIGN PATENT DOCUMENTS

| CN | 1675584 | 9/2005 |
|---|---|---|
| CN | 1808226 | 7/2006 |
| JP | 2006-114445 | 4/2006 |

\* cited by examiner

*Primary Examiner*—Thoi V Duong
(74) *Attorney, Agent, or Firm*—Antonelli, Terry, Stout & Kraus, LLP.

(57) ABSTRACT

In a joint portion of a corner portion at which a raised portion of a side wall portion of a reflection sheet which is mounted on a back surface plate and a side wall portion of a side mold frame intersect each other, an end portion of the side mold frame is formed in a state that the end portion of the side mold frame overlaps the side wall portion of the reflection sheet. Due to such a constitution, a gap which is formed by a displacement of the reflection sheet is closed and hence, it is possible to suppress the intrusion of dusts into the inside of a liquid crystal display device.

3 Claims, 8 Drawing Sheets

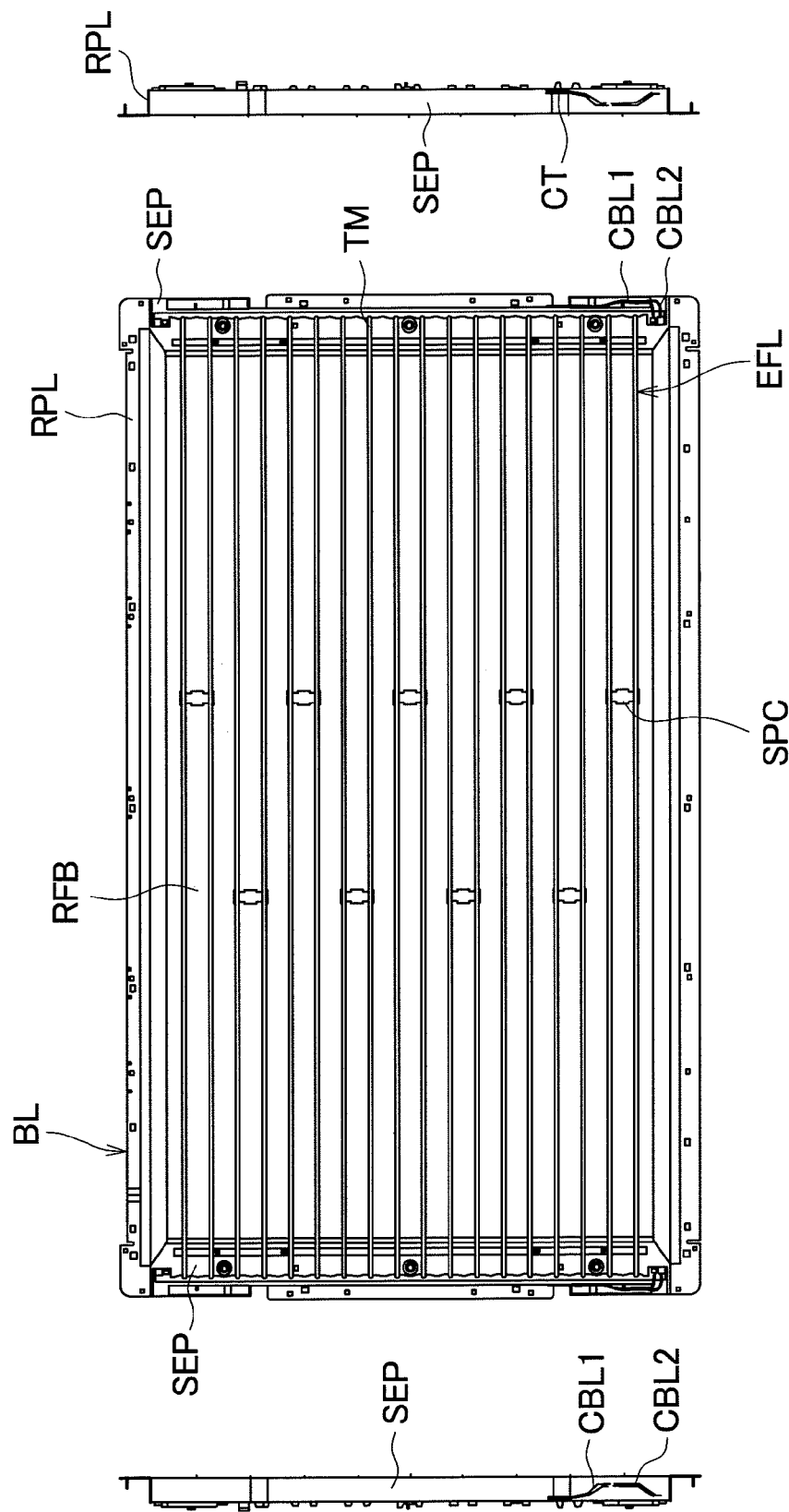

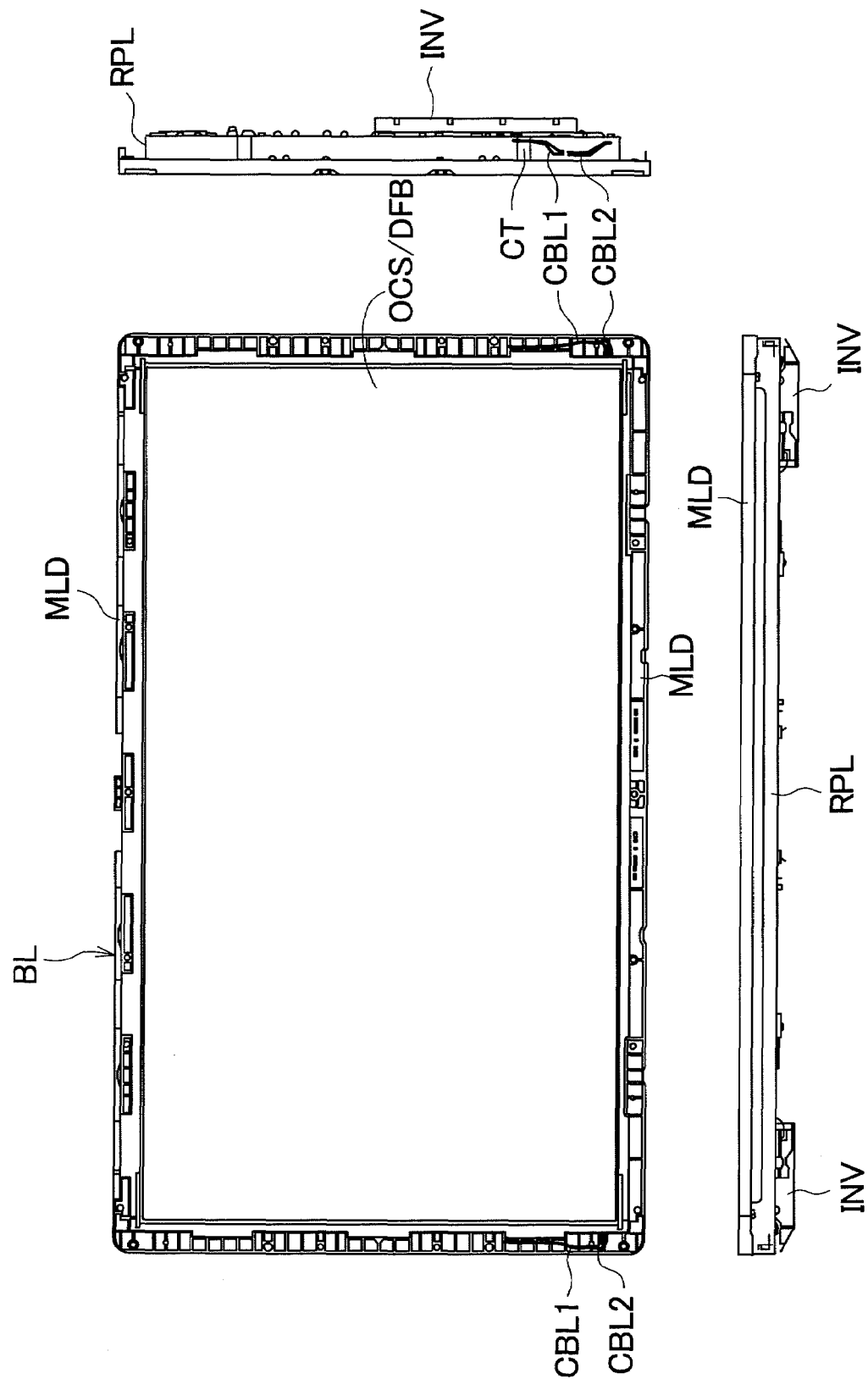

LIQUID CRYSTAL DISPLAY DEVICE

The present application claims priority from Japanese applications JP2006-337867 filed on Dec. 15, 2006, the content of which is hereby incorporated by reference into this application.

BACKGROUND OF THE INVENTION

The present invention relates to a liquid crystal display device having a direct light backlight structural body on a back surface of a liquid crystal panel, and more particularly to the joint structure of a back plate which constitutes the backlight structural body and a side mold frame which supports a fluorescent tube. To be more specific, the present invention relates to the foreign-material-intrusion preventing structure for preventing the intrusion of foreign materials from a joint portion of a raised portion of a reflection sheet which is mounted on a side wall portion of the back plate and an end portion of the side mold frame.

As a display device for a television receiver set or an information digital assistant, a liquid crystal display device has been popularly used. Generally, in this type of liquid crystal display device which is relatively large-sized and is required to possess a screen with high brightness, as a backlight structural body which constitutes an auxiliary illumination device of the liquid crystal display device, a so-called direct light backlight structural body which arranges a plurality of linear light sources on a back surface of the liquid crystal display panel and directly radiates light from the linear light sources on the back surface of the liquid crystal display panel is adopted. Here, "direct-light-type" is an expression which is used in contrast with a so-called side light backlight structural body which performs illumination by arranging a linear light source similar to the above-mentioned linear light source on a side of a light guide plate which is mounted on a back surface of the liquid crystal display panel.

The direct-light-type backlight structural body is mainly constituted of a reflection sheet which is arranged in a state that the reflection sheet faces a back surface of a liquid crystal display panel, a light diffusion plate which is arranged on a front surface side of the reflection sheet, and fluorescent lamps which are arranged between the reflection sheet and the light diffusion plate. These constitutional members are integrally formed with each other using a back surface plate which is formed in an approximately trough shape, a side mold frame which is mounted on the back surface plate, a frame-shaped mold frame in which the back surface plate which mounts the side mold frame thereon is fitted and the like, for example.

To be more specific, for example, the reflection sheet is mounted on the back surface plate formed in a substantially trough shape. Alternatively, a laminate plate which is formed by laminating a reflection sheet on a relatively hard metal sheet is formed in a substantially trough shape, and the reflection sheet is fixed to the back surface plate by adhering or mounting the approximately trough-shaped laminate plate to a bottom portion, a side wall portion and the like of the approximately trough-shaped back surface plate. The fluorescent lamps are supported on the side mold frame which is mounted on the back surface plate. Further, a diffusion plate has a peripheral portion thereof sandwiched by the back surface plate and the mold frames.

In general, with respect to the direct-light-type backlight structural body, in a relatively large-sized liquid crystal display device, a large-sized sheet has been used as the above-mentioned reflection sheet. However, it is difficult to neatly adhere the large-sized reflection sheet to the back surface plate using a double-sided adhesive film. Further, there exists a drawback that a cost of the laminate plate becomes high.

For overcoming such drawbacks, following patent document 1 (JP-A-2006-114445) discloses a direct-light-type backlight structural body which can facilitate mounting of a reflection sheet on a back surface plate at a low cost by enabling the reflection sheet to move relative to the side mold frame in the direction parallel to a surface of the back surface plate which faces the fluorescent lamps.

SUMMARY OF THE INVENTION

However, in the direct-light-type backlight structural body having such a constitution, as shown in FIG. 7A which is an enlarged perspective view of an essential part of the direct-light-type backlight structural body, a gap is formed in a joint portion CON at which a raised portion STA of a side wall portion of a reflection sheet RFB which is mounted on a substantially trough-shaped back surface plate RPL and an end portion of a side mold frame SML intersect each other. FIG. 7B is a cross-sectional view of the vicinity of the joint portion CON taken along a line A-A' in FIG. 7A. As shown in FIG. 7A and FIG. 7B, on a short side of the backlight structural body, the reflection sheet RFB is fixed in a state that the reflection sheet RFB is sandwiched by the back surface plate RPL and the side mold frame SML. Usually, by taking the presence of bending tolerance and assembling tolerance of the reflection sheet RFB into consideration, a certain clearance D is formed between a side wall of the back surface plate RPL and an end portion of the side mold frame SML.

However, a shape of a bent portion formed between an upper surface portion and the side wall of the back surface plate RPL does not exhibit a complete right angle in an actual product. That is, the bent portion exhibits a curved surface having a radius of curvature R. Since the raised portion STA of the reflection sheet RFB is formed obliquely, due to the presence of the radius of curvature R, there exists a possibility that the reflection sheet RFB per se is displaced to the outside by a movable range RD of the reflection sheet RFB. In the case of a 32-inch liquid crystal display device, the movable range RD of the reflection sheet is approximately 1.0 mm, and the clearance D is approximately 0.6 mm.

Accordingly, an actual movable range of the reflection sheet RFB is determined by adding a movable range RD and a clearance D. In the above-mentioned example of the 32-inch liquid crystal display device, there exists a possibility that a gap G of approximately 1.6 mm is formed between the reflection sheet RFB and the end portion of the side mold frame SML. When such a large gap is formed, there arises a drawback that foreign materials such as dusts adhered to the respective constitutional members intrude into the inside of the backlight structural body through the gap G at the time of assembling the backlight constitutional body, and the foreign materials are adhered to a surface of an optical compensation sheet stacked body or an inner side of an effective display region of a liquid crystal display panel thus lowering display quality at the time of displaying images on a display panel whereby quality and reliability of a product are impaired. Here, in FIG. 7A and FIG. 7B, symbol EFL indicates an external electrode fluorescent lamp.

The present invention has been made to overcome the above-mentioned conventional drawbacks, and it is an object of the present invention to provide a liquid crystal display device which can enhance quality and reliability of a product by preventing foreign materials from intruding into an optical compensation sheet stacked body and the inside of an effective display region of a liquid crystal display panel.

To achieve the above-mentioned objects, the present invention is characterized in that, in a liquid crystal display device which includes a liquid crystal display panel, and a direct light backlight structural body which is arranged on a back surface of the liquid crystal display panel, the backlight structural body includes a plurality of fluorescent lamps which is arranged in parallel to each other between a trough-shaped back surface plate and a frame-shaped mold frame in a state that the plurality of fluorescent lamps faces the back surface plate in an opposed manner, a side mold frame which is mounted on the back surface plate and covers electrode portions of the fluorescent lamps, and a reflection sheet which is arranged between the back surface plate and the fluorescent lamps as well as between the back surface plate and the side mold frame, and an end portion of the side mold frame includes an extending portion which is formed in a state that the extending portion extends to a position outside a side wall portion of the back surface plate.

Further, an extending portion which is bent along a raised portion of the reflection sheet may preferably be formed on the end portion of the side mold frame.

According to the present invention, it is possible to prevent the intrusion of foreign materials into the effective display region of the liquid crystal display panel and hence, lowering of display quality at the time of displaying images can be prevented thus providing an extremely excellent advantageous effect that a liquid crystal display device having high quality and high reliability can be easily obtained.

BRIEF DESCRIPTION OF THE DRAWINGS

FIG. 2 is a combinational view consisting of a top plan view and side views of a back surface plate shown in FIG. 1 as viewed from a surface of the back surface plate on which external electrode fluorescent lamps are mounted;

FIG. 5 is a combinational view consisting of a top plan view and side views showing an appearance of the backlight structural body of the present invention;

DESCRIPTION OF THE PREFERRED EMBODIMENTS

Hereinafter, preferred embodiments of the present invention are explained in detail in conjunction with drawings showing these embodiments.

Embodiment 1

Figure 1:
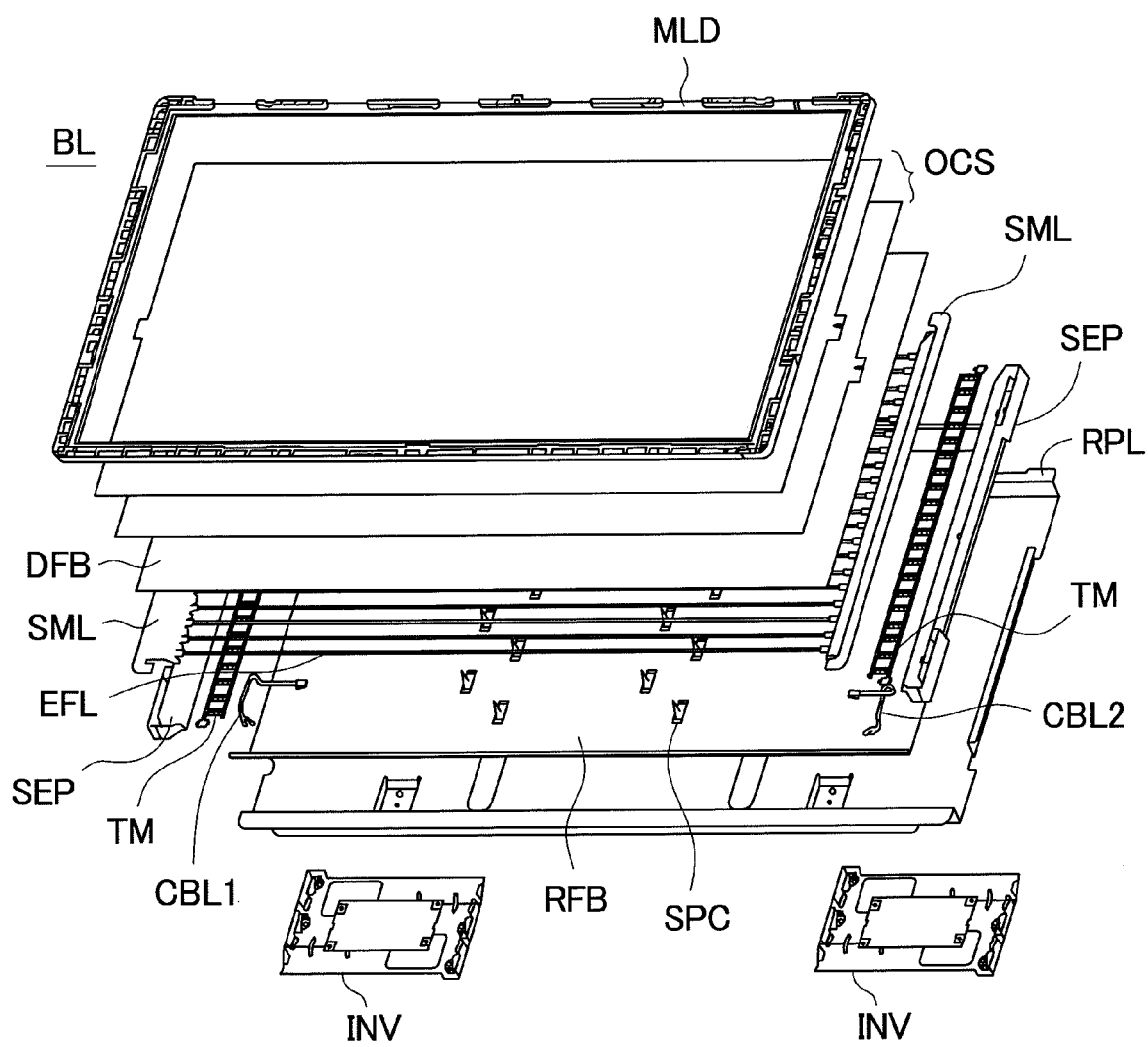
FIG. 1 is an exploded perspective view of a backlight structural body for explaining one embodiment of a liquid crystal display device according to the present invention.
Figure 6:
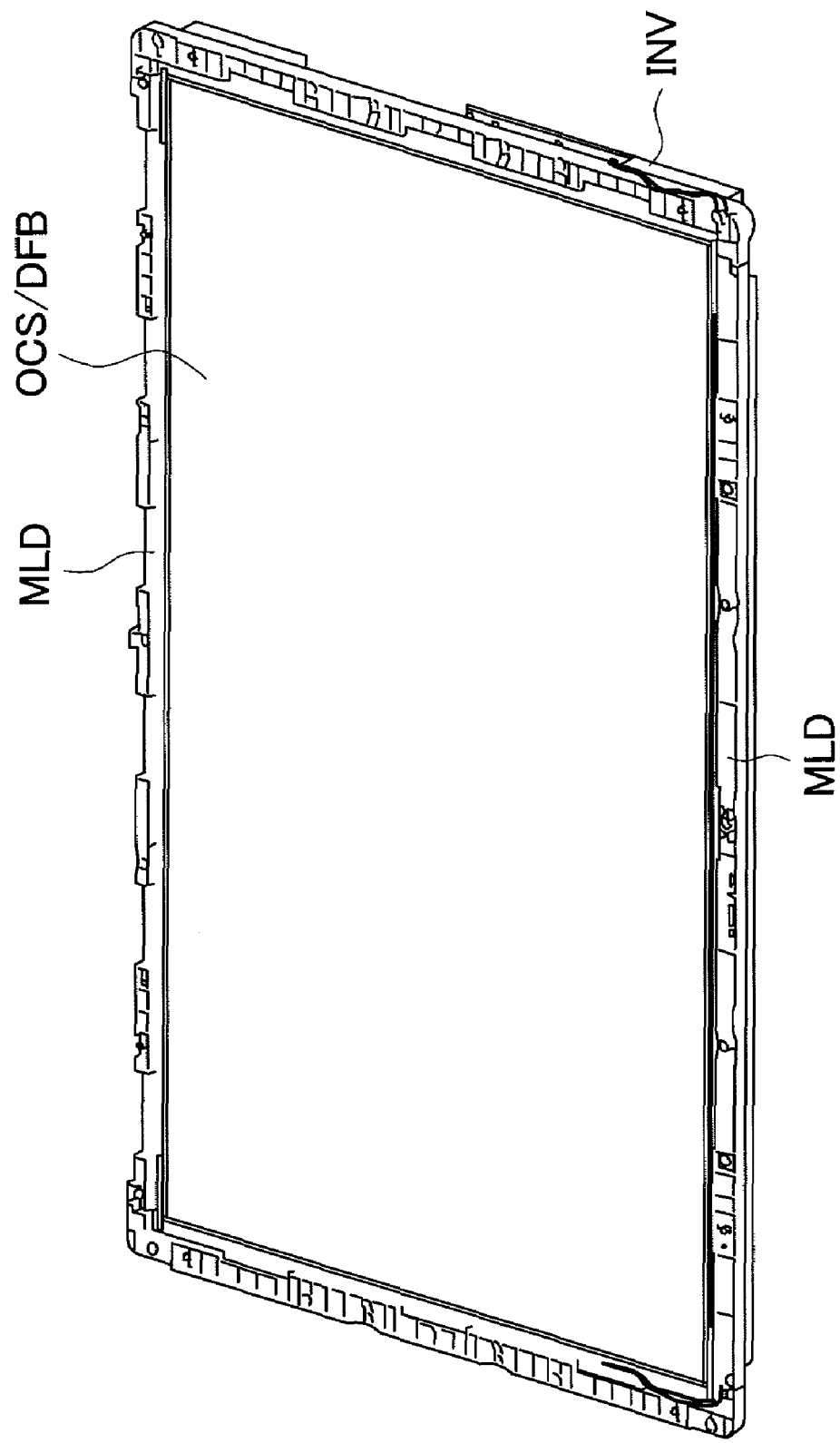
FIG. 6 is a perspective view showing an appearance of the backlight structural body of the present invention.

FIG. 5 is a combinational view consisting of a top plan view and side views showing an appearance of a liquid crystal display device and a backlight structural body according to the present invention. Further, FIG. 6 is a perspective view showing an appearance of the liquid crystal display device and the backlight structural body BL according to the present invention. Although a detailed explanation is made later, the backlight structural body is assembled as follows. After mounting fluorescent lamps EFL on a side mold frame SML, a space restriction plate SEP shown in FIG. 1 is arranged in the vicinity of a terminal TM. A diffusion plate DFB and an optical compensation sheet stacked body OCS are overlapped to the side mold frame SML. Then, a mold frame MLB is mounted on and is fastened to an uppermost portion of the backlight structural body using screws.

On a back surface of the back surface plate RPL, a power source portion PCB which stores an inverter printed circuit board (power source substrate) therein is arranged, and connectors CT which are formed on another ends of power supply cables CBL1, CBL2 are connected to the inverter printed circuit board INV. In this specification, although the inverter printed circuit board INV is arranged at two corner positions of the back surface of the back surface plate RPL, the arrangement positions and the number of the inverter printed circuit boards are not limited.

FIG. 1 is an exploded perspective view showing an essential part of the backlight structural body shown in FIG. 5 and FIG. 6. The backlight structural body is of a direct light type. The backlight structural body BL of this embodiment is configured such that a reflection sheet RFB, a pair of under frames SEP which includes power supply terminals TM for fixedly holding a plurality of external electrode fluorescent lamps EFL which constitutes a linear light source, a side mold frame SML which covers a connection portion of the external electrode fluorescent lamps EFL and the power supply terminal TMs from above, a diffusion plate DFB, and an optical compensation sheet stacked body OCS which is formed by stacking a prism sheet, a diffusion sheet and the like are stacked and arranged in order between a trough-shaped back surface plate RPL which is formed of a metal plate material and a frame-shaped mold frame MLD which is formed of a resin formed body.

Here, in the backlight structural body BL having such a constitution, spacers SPC are mounted on the back surface plate RPL in an erected manner for suppressing the non-uniformity of illumination distribution attributed to the deflection of the large-sized diffusion plate DFB. The spacers SPC are brought into contact with a back surface of the diffusion plate DFB by way of through holes formed in the reflection sheet RFB. Further, the spacers SPC may include the branched projection structure which suppresses the deflection of the elongated external electrode fluorescent lamps EFL. Although not shown in the drawing, a liquid crystal display panel is arranged on the mold frame MLD.

Further, on both end sides of a lower side portion of a surface of the back surface plate RPL on a side opposite to a surface of the back surface plate RPL on which the external electrode fluorescent lamps EFL are mounted, a pair of inverter printed circuit boards INV which drives the plurality of external electrode fluorescent lamps EFL while inverting phases of the respective lamps EFL is mounted. The inverter printed circuit board INV mounts an inverter circuit which is constituted of a toroidal-coil-type transformer, an electrolytic capacitor and the like thereon.

Further, in the inverter circuit of the inverter printed circuit board INV, the external electrodes which are mounted on one end side of the plurality of external electrode fluorescent lamps EFL are electrically connected to the power supply terminals TM of the side mold frame SML by way of power supply cables CBL1, CBL2. Here, a high frequency current flows in the power supply cables CBL1, CBL2 and hence, it is preferable to make a length of the cable as short as possible.

Further, drive voltages whose phases are inverted from each other are supplied to the external electrodes formed on both ends of the external electrode fluorescent lamp EFL in synchronism. With respect to the drive voltages, a high frequency output of the inverter circuit is supplied to one external electrode, and a high frequency output whose phase is inverted by the transformer is supplied to another external electrode.

In assembling such a liquid crystal display device, the liquid crystal display panel and the backlight structural body BL are independently assembled in respective steps and, thereafter, the liquid crystal display panel is integrally formed on the backlight structural body BL in an overlapping manner. The backlight structural body BL is obtained by assembling a plurality of constitutional members shown in FIG. 1. That is, the reflection sheet RFB is mounted on the trough-shaped back surface plate RPL, the under frames SEP are mounted on both left and right ends of the reflection sheet RFB, the external electrode fluorescent lamps EFL are set such that the lamps EFL extend between the power supply terminals TM which are formed on both under frames SEP, and the power supply terminal TM portions are covered with the side mold frame SML.

The side mold frame SML includes comb-shaped teeth which are interposed between the external electrode fluorescent lamps EFL. The diffusion plate DFB is arranged on the side mold frame SML, the optical compensation sheet stacked body OCS is stacked on the diffusion plate DFB and, thereafter, the frame-shaped mold frame MLD is arranged on the optical compensation sheet stacked body OCS. Then, these parts are integrally fixed all together using bolts or the like. Finally, the inverter printed circuit boards INV are arranged on both end sides of the lower side portion of the surface of the back surface plate RPL on a side opposite to the surface on which the external electrode fluorescent lamps EFL are mounted and are integrally fixed to the surface using bolts or the like.

FIG. 2 is a plan view of an essential part of the backlight structural body BL. FIG. 2 shows a state in which the fluorescent lamps EFL are mounted on the under frames SEP above the back surface plate RPL. As shown in FIG. 2, on an inner side (bottom surface) of the trough-shaped back surface plate RPL and on side wall portions of the back surface plate RPL which are obliquely raised up to banks on long sides from the inner side, the reflection sheet RFB is integrally mounted.

On both short sides of the back surface plate RPL, the side mold frame SML which covers the power supply terminals TM is arranged.

Figure 3A:
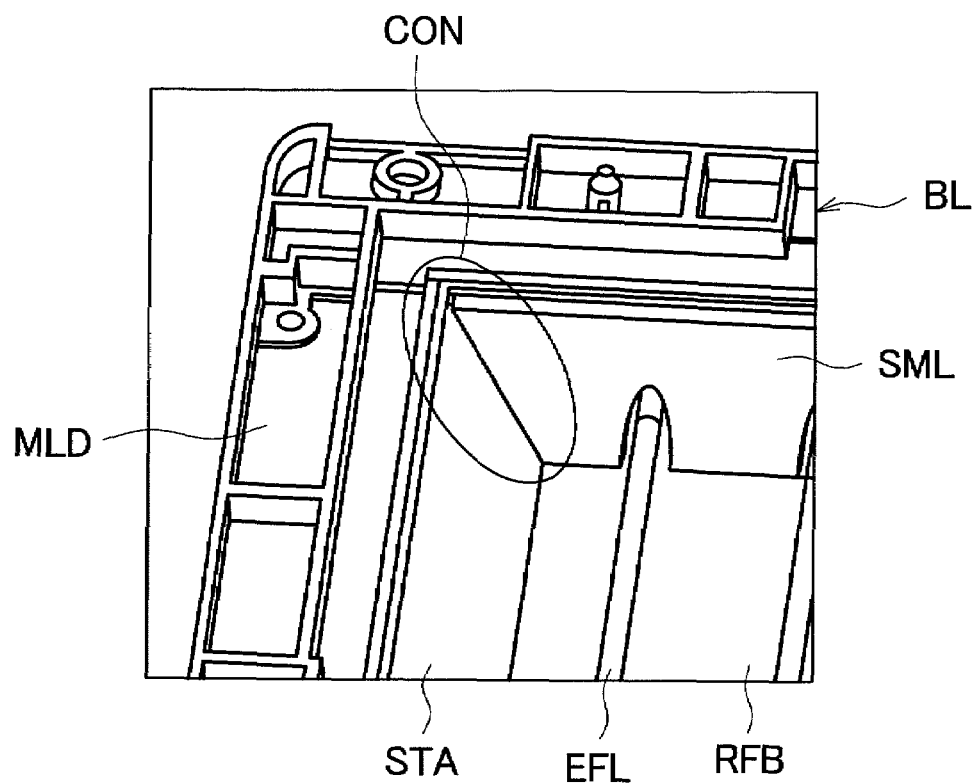
FIG. 3A is an enlarged perspective view of a joint portion of the back surface plate and a side mold frame showing the constitution of an embodiment 1 of a direct-light-type backlight structural body used in a liquid crystal display device according to the present invention.
Figure 3B:
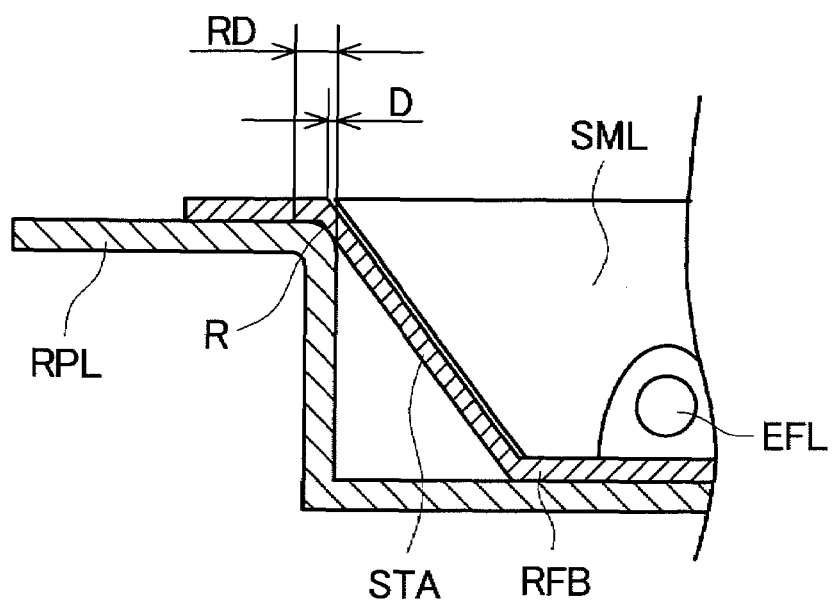
FIG. 3B is a cross-sectional view showing the constitution of the embodiment 1 of the direct-light-type backlight structural body used in the liquid crystal display device according to the present invention taken along a surface perpendicular to an extending direction of fluorescent lamps arranged in the vicinity of the joint portion.

FIG. 3A and FIG. 3B are views showing a detail of the joint portion CON of the back surface plate RPL and the side mold frame SML which constitutes an essential part of the present invention. FIG. 3A is an enlarged perspective view of the joint portion CON of the back surface plate RPL and the side mold frame SML. FIG. 3B is a cross-sectional view of the vicinity of the joint portion CON taken along a surface perpendicular to an extending direction of the fluorescent lamps EFL and is a view corresponding to FIG. 7B. As shown in FIG. 3A, in the joint portion CON at which the end portion of the back surface plate RPL and the end portion of the side mold frame SML join each other, side wall portions of both of back surface plate RPL and the side mold frame SML have inclined surfaces.

Figure 7A:
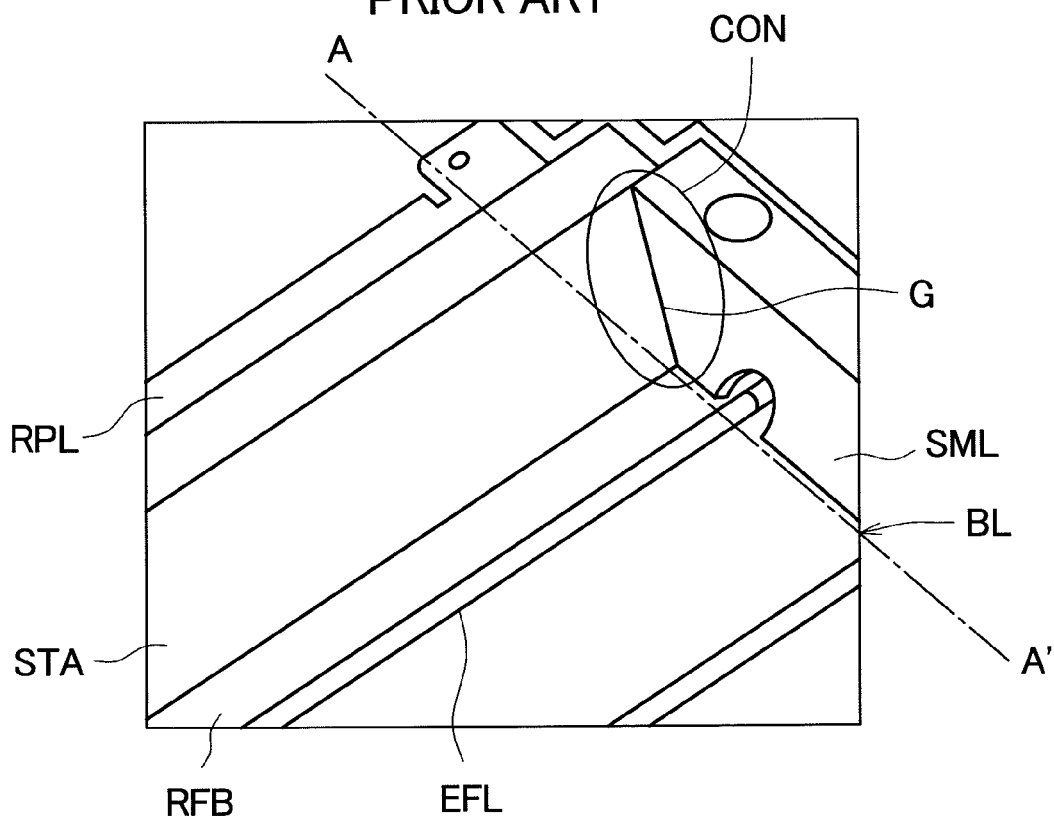
FIG. 7A is a view showing the constitution of the direct light backlight structural body used in a liquid crystal display device.
Figure 7B:
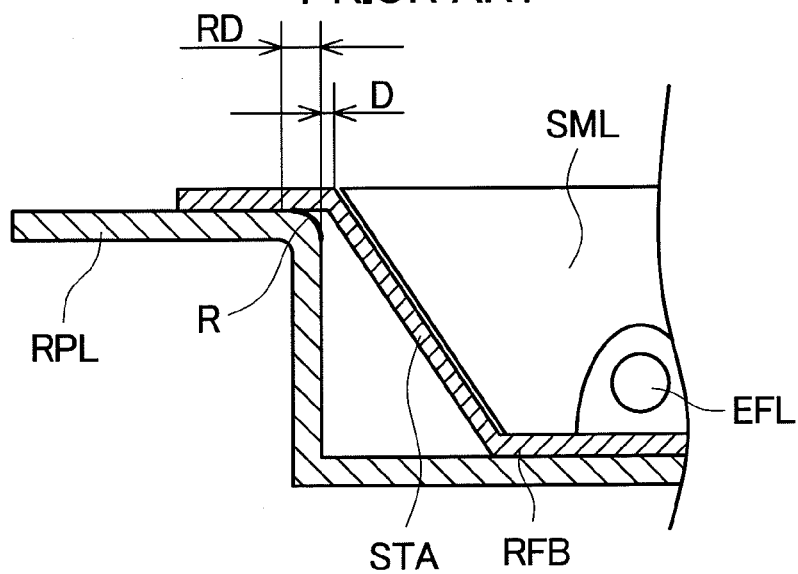
FIG. 7B is a cross-sectional view taken along a line A-A' in FIG. 7 showing the constitution of the direct-light-type backlight structural body used in the liquid crystal display device.

Further, as shown in FIG. 3B, in this embodiment, the end portion of the side mold frame SML is arranged more outside than the side wall of the back surface plate RPL. In FIG. 7B, the clearance D is expressed as 0.6 mm when the 32-inch liquid crystal display panel is adopted. To express the clearance D shown in FIG. 3B in the manner the clearance D shown in FIG. 7B is expressed, the side mold frame SML is formed such that the clearance D becomes −0.4 mm when the 32-inch liquid crystal display panel is adopted.

Due to such a constitution, the raised portion STA of the side wall portion of the reflection sheet RFB which is mounted on the back surface plate RPL is brought into closer contact with the side wall of the back surface plate RPL. As in the case of the 32-inch liquid crystal display panel, an actual movable range of the reflection sheet RFB becomes 0.6 mm (RD+D=1.0 mm+(−0.4 mm)=0.6 mm) and hence, compared to a case shown in FIG. 7B, the gap can be largely narrowed to further effectively close the gap.

Due to such a constitution, it is possible to prevent the intrusion of foreign materials such as dusts adhered to the respective constitutional members into the optical compensation sheet stacked body and the inside of the liquid crystal display panel from the joint portion CON at the time of assembling the backlight structural body. Accordingly, the dusts are hardly adhered to the surface of the optical compensation sheet stacked body, a display surface of the liquid crystal display panel and the like.

Embodiment 2

Figure 4A:
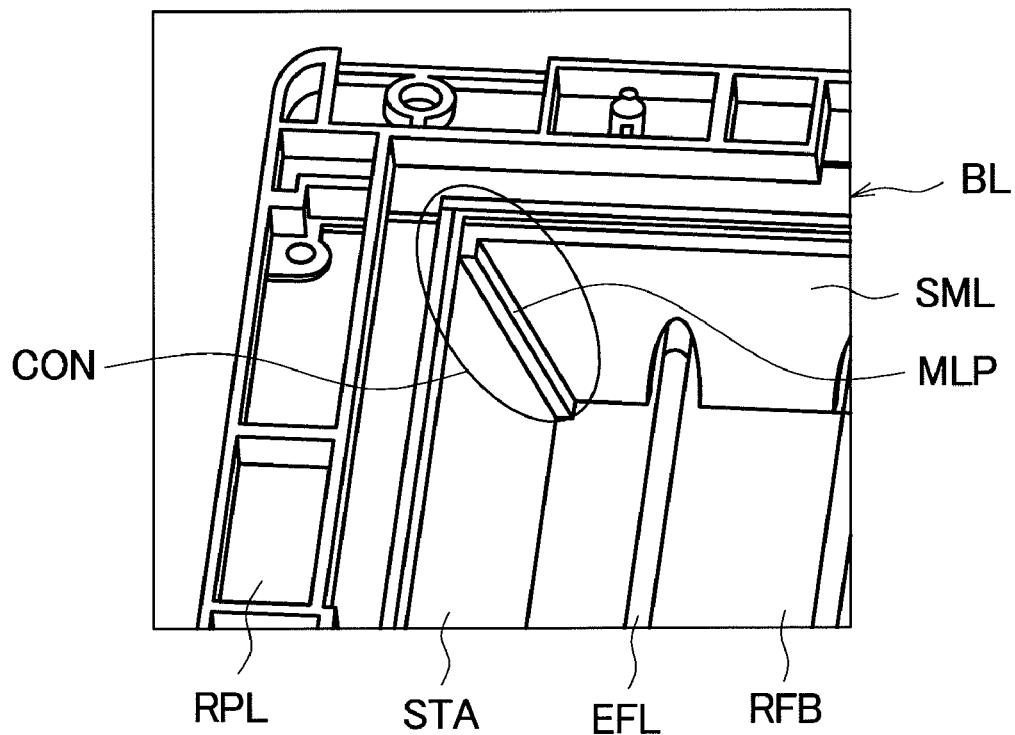
FIG. 4A is a view showing the constitution of an embodiment 2 of the direct-light-type backlight structural body used in the liquid crystal display device according to the present invention.
Figure 4B:
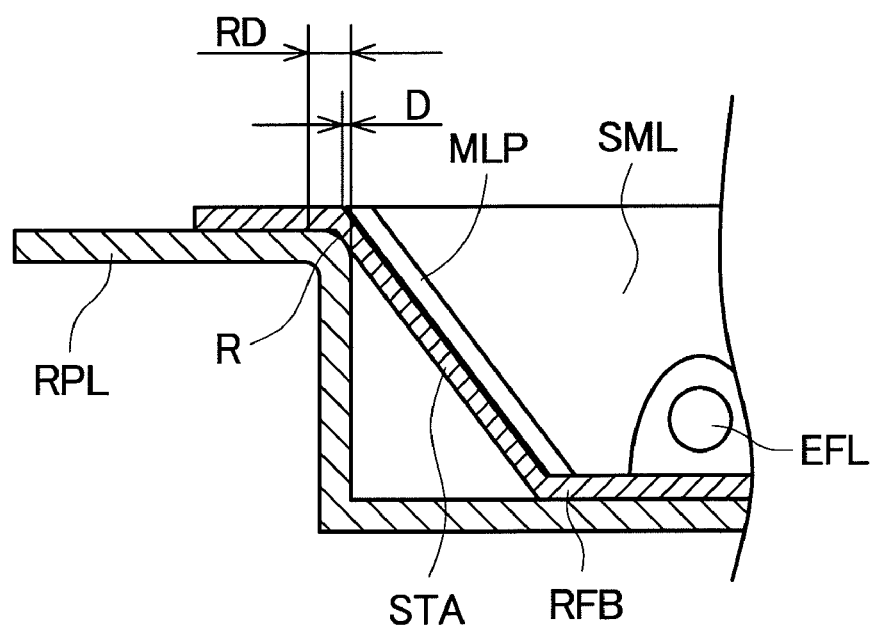
FIG. 4B is a cross-sectional view of an essential part of the vicinity of the joint portion shown in FIG. 4A taken along a surface perpendicular to an extending direction of fluorescent lamps.
Figure 4C:
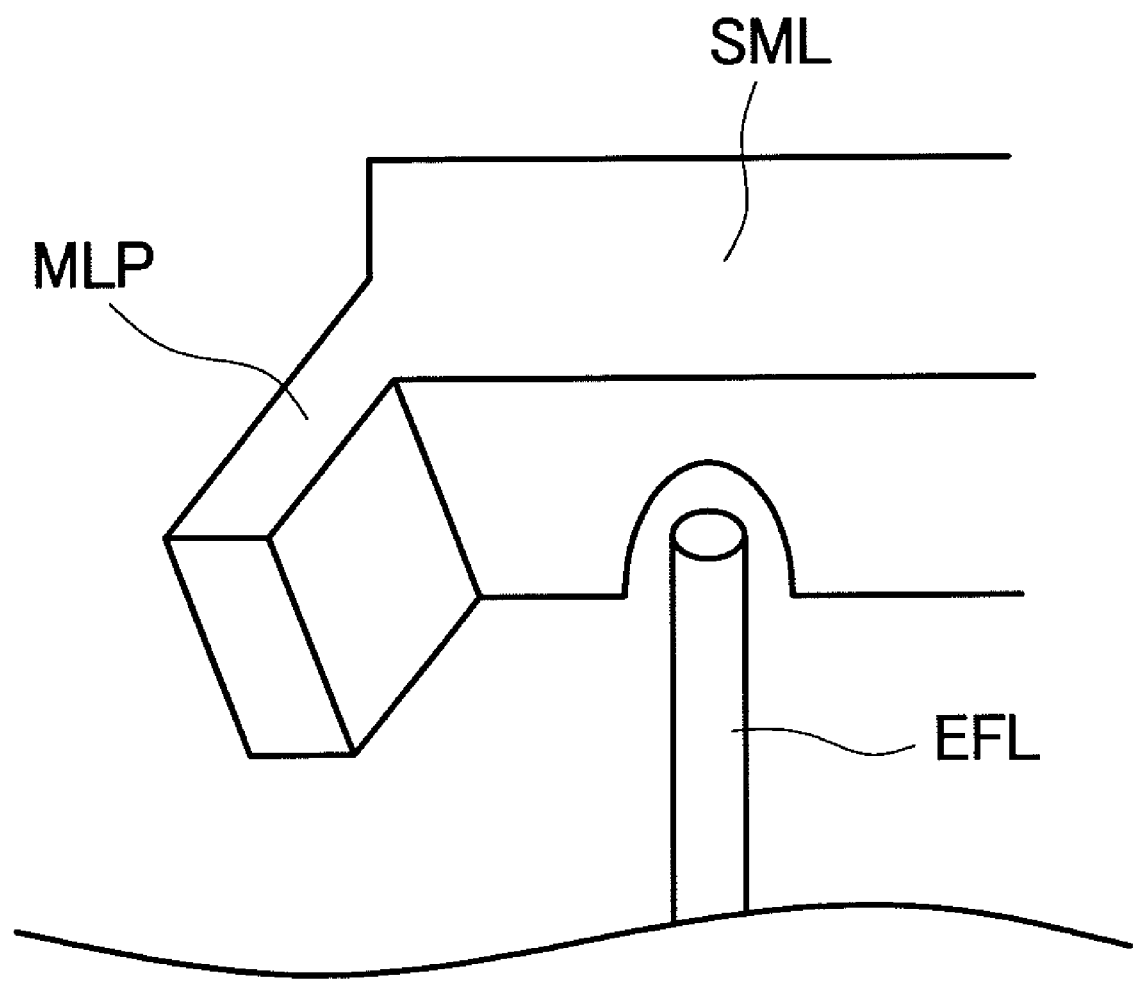
FIG. 4C is a schematic constitutional view of the side mold frame shown in FIG. 4A as viewed from above.

FIG. 4A, FIG. 4B and FIG. 4C are views showing the constitution of an embodiment 2 of the present invention. FIG. 4A is an enlarged perspective view of a joint portion CON of a back surface plate RPL and a side mold frame SML. FIG. 4B is a cross-sectional view of the vicinity of the joint portion CON taken along a surface perpendicular to an extending direction of fluorescent lamps EFL and is a view corresponding to FIG. 7B. FIG. 4C is a schematic constitutional view of the side mold frame SML as viewed from above. In these drawings, parts identical with the parts shown in the above-mentioned drawings are given the same symbols, and their explanation is omitted.

In FIG. 4A, FIG. 4B and FIG. 4C, a point which makes this embodiment differ from the embodiment shown in FIG. 3A and FIG. 3B lies in that, on an end portion of a side mold frame SML which is joined with an end portion of the back surface plate RPL, a side mold frame extending portion MLP which is bent along a raised portion STA of a side wall portion of a back surface plate RPL is integrally formed. The side mold frame extending portion MLP is formed of the same formed body for forming the side mold frame SML with a small wall thickness and a length of approximately 1 mm. Further, as shown in FIG. 4C, the side mold frame extending portion MLP is preferably formed with an angle slightly inclined toward the side wall portion of the back surface plate RPL.

That is, according to the constitution of this embodiment, the side mold frame extending portion MLP is arranged on the raised portion STA of the reflection sheet RFB which is mounted on the side wall surface of the back surface plate RPL in an overlapping manner, and the side mold frame extending portion MLP is formed into a shape so as to push the raised portion STA.

Due to such a constitution, even when the reflection sheet RFB is moved to a position closest to the back surface plate RPL so that a gap is formed between the reflection sheet RFB and the side mold frame SML, the side mold frame extending portion MLP which is integrally formed on the end portion of the side mold frame SML plays a role of a lid thus closing the gap. Accordingly, in assembling the backlight structural body, it is possible to prevent the intrusion of the foreign materials such as dusts into the inside of the mounting portion of the optical compensation sheet stacked body and the liquid crystal display panel. Accordingly, the dusts are hardly adhered to the surface of the optical compensation sheet stacked body and the display surface of the liquid crystal display panel and the like.

Here, the joint structure which adopts the side mold frame extending portion MLP integrally formed on the end portion of the side mold frame SML is explained with respect to only one corner out of four corners of the back surface plate RPL in conjunction with drawings. However, in the actual constitution, the joint portions formed in three other corners are also constituted in the same manner as the above-mentioned constitution.

Here, in the above-mentioned respective embodiments, although the explanation has been made with respect to the case in which the external electrode fluorescent lamps are used as a plurality of fluorescent lamps EFL arranged in parallel on the back surface plate RPL, it is needless to say that, even when cold cathode fluorescent lamps (CCFL) are used in place of the external electrode fluorescent lamps, advantageous effects substantially equal to the above-mentioned advantageous effects can be obtained.

What is claimed is:

1. A liquid crystal display device comprising:
   a liquid crystal display panel; and
   a direct light backlight structural body which is arranged on a back surface of the liquid crystal display panel, wherein
   the backlight structural body includes:
   a plurality of fluorescent lamps which is arranged in parallel to each other between a trough-shaped back surface plate and a frame-shaped mold frame in a state that the plurality of fluorescent lamps faces the back surface plate in an opposed manner;
   a side mold frame which is mounted on the back surface plate and covers electrode portions of the fluorescent lamps; and
   a reflection sheet which is arranged between the back surface plate and the fluorescent lamps as well as between the back surface plate and the side mold frame, and
   an end portion of the side mold frame includes an extending portion which is formed in a state that the extending portion extends to a position outside a side wall portion of the back surface plate and, at the same time, is bent along a raised portion of the reflection sheet.

2. A liquid crystal display device according to claim 1, wherein the extending portion is integrally formed with the side mold frame using a formed body of a same resin material.

3. A liquid crystal display device according to claim 1, wherein the side mold frame is arranged along two sides of the mold frame which face each other in an opposed manner.

* * * * *

UNITED STATES PATENT AND TRADEMARK OFFICE
CERTIFICATE OF CORRECTION

PATENT NO. : 7,701,528 B2
APPLICATION NO. : 11/956373
DATED : April 20, 2010
INVENTOR(S) : Azuma et al.

It is certified that error appears in the above-identified patent and that said Letters Patent is hereby corrected as shown below:

Title page, item (73) Assignees should read as follows: Hitachi Displays, Ltd., Mobara-shi (JP); IPS Alpha Technology, Ltd., Mobara-shi (JP)

Signed and Sealed this

Twenty-eighth Day of September, 2010

David J. Kappos
*Director of the United States Patent and Trademark Office*